(12) United States Patent
Lestician (10) Patent No.: US 9,788,395 B2
(45) Date of Patent: Oct. 10, 2017

(54) VISIBLE AND NONVISIBLE LIGHT BULB DRIVER AND SYSTEM

(71) Applicant: Guy J. Lestician, E. Stroudsburg, PA (US)

(72) Inventor: Guy J. Lestician, E. Stroudsburg, PA (US)

(73) Assignee: LUXOR SCIENTIFIC, INC, Marshalls Creek, PA (US)

( * ) Notice: Subject to any disclaimer, the term of this patent is extended or adjusted under 35 U.S.C. 154(b) by 525 days.

(21) Appl. No.: 14/544,069

(22) Filed: Nov. 20, 2014

(65) Prior Publication Data

US 2016/0150620 A1    May 26, 2016

(51) Int. Cl.
  *H05B 37/02* (2006.01)
  *H05B 33/08* (2006.01)

(52) U.S. Cl.
  CPC ..... *H05B 37/0245* (2013.01); *H05B 33/0815* (2013.01); *Y02B 20/341* (2013.01)

(58) Field of Classification Search
  CPC ............ H05B 33/0815; H05B 33/0818; H05B 33/0884; H05B 33/0809; H05B 33/0848; H05B 33/0851; H05B 41/3925; H05B 41/391; H05B 41/2828; H05B 41/2858; H05B 33/0803
  USPC ................................ 315/294, 224, 307, 121
  See application file for complete search history.

(56) References Cited

U.S. PATENT DOCUMENTS

| | | | |
|---|---|---|---|
| 5,039,920 A | 8/1991 | Zonis | |
| 5,287,040 A * | 2/1994 | Lestician | H05B 41/3925 315/119 |
| 5,323,090 A | 6/1994 | Lestician | |
| 5,612,597 A | 3/1997 | Wood | |
| 7,312,582 B2 | 12/2007 | Newman, Jr. et al. | |
| 7,952,293 B2 | 5/2011 | Kelly | |
| 8,441,210 B2 | 5/2013 | Shteynberg et al. | |
| 9,320,093 B2 * | 4/2016 | Tikkanen | H05B 33/0815 |
| 2004/0095081 A1 * | 5/2004 | Kernahan | H05B 41/3927 315/307 |
| 2010/0060175 A1 * | 3/2010 | Lethellier | H05B 33/0815 315/164 |
| 2010/0096995 A1 * | 4/2010 | Kishimoto | H05B 41/2985 315/119 |
| 2010/0164579 A1 * | 7/2010 | Acatrinei | H02M 1/4208 327/172 |

(Continued)

*Primary Examiner* — Douglas W Owens
*Assistant Examiner* — Syed M Kaiser
(74) *Attorney, Agent, or Firm* — Dierdra M. Meagher; Kenneth P. Glynn (57) ABSTRACT

An electronic lighting system with a driver for providing light from visible light bulbs and non-visible light bulbs, including from infrared, ultraviolet, LED and fluorescent lamps of multiple sizes and wattages, having power factor correction, surge protection, current sensing, current adjustment feedback, and dimming system. There are transformers dedicated to particular lamp receptacles that include interloper diodes and resistor sets that fine tune the functioning of the driver sensing loads. Comparator circuitry receives an external control signal and compares it to feedback from the output side of the circuitry, and thereby controls the Pulse Width Modulation circuitry, which cooperates with feedback-based transistors and a MOSFET gate driver circuit for current limiting to the loads being applied.

19 Claims, 8 Drawing Sheets

(56) References Cited

U.S. PATENT DOCUMENTS

| | | | |
|---|---|---|---|
| 2011/0204820 A1* | 8/2011 | Tikkanen | H05B 33/0815 315/294 |
| 2012/0280637 A1* | 11/2012 | Tikkanen | H05B 33/0803 315/294 |
| 2015/0312985 A1* | 10/2015 | Chappell | H02J 7/025 315/210 |

* cited by examiner

VISIBLE AND NONVISIBLE LIGHT BULB DRIVER AND SYSTEM

REFERENCE TO RELATED APPLICATIONS

The present application is not related to any pending or issued United States of America or foreign patent or patent application.

BACKGROUND OF INVENTION a. Field of Invention

Ultraviolet and other non-visible light bulbs are being used in many diverse applications, and a significant growth area involves sanitizing and/or destruction of germs, pathogens and other undesirable or unhealthy organisms in airborne applications, surface applications and even liquid treatments, such as water, blood and blood components. In addition, LED lighting is replacing fluorescent lighting rapidly and is expected to be very commonly used extensively throughout office buildings, schools, hospitals, industrial plants, malls, and homes for lighting, outdoor lighting, and for many other uses. Likewise High Intensity LED lamps and similar high intensity applications are also growing rapidly. Unfortunately, due to individual LED failures, as well as due to variations in power, power factor, brown out, surges and other system variations or failures that cause complete LED lamp failure, LED applications are undergoing significant, unacceptable failures and are seeing a reconsideration of LED uses. Many new systems will, thus, continue to utilize fluorescent lamps, but owners many want to or may be required to switch over to LEDs at some future date. The present invention is directed to a driver (controller) that is different and superior to existing LED controllers and drivers, as well as fluorescent and ultraviolet drivers, and eliminates nearly all of their predecessor problems, including corrections for all of the stated difficulties above. In addition, this same present invention driver is just as beneficial for non-visible light as it is for visible light. Thus, the present invention is an electronic driver for both visible and non-visible light bulbs and can be programmed to drive selected wavelengths, as well as selected types of lamps, such as LED lamps, ultraviolet lamps and fluorescent lamps, wherein they are uniquely interchangeable with the same present invention driver. Additionally, the present invention drivers and lamp systems control the output power for optimum control and use, utilizing sensing components and adapting to different wattages and making corrective adjustments to current features. These present invention drivers also employ power factor control, voltage and surge protection, and uniquely recognize and adjust to different power changes to non-visible and LED and fluorescent lamps, as well as correct for dead individual lamps or bulbs and for dead lamps in a bank of lamps. Thus, when one or more bulbs fail, power to the remaining bulbs or LEDs does not adversely change, but is immediately corrected to account for the loss.

b. Description of Related Art

The following patents are of interest to the present invention technology:

U.S. Pat. No. 5,039,920 discloses a ballast for control of a two-pin fluorescent lamp. This device utilizes an even more complex system to supply a wave with a "noncontinuous sinusoidal shape" to the lamps. Effectively these lamps see a single cycle of a sine wave followed by a "notch" or dead zone and then another single cycle.

U.S. Pat. No. 5,287,040 to Guy Lestician, the present inventor herein, is directed to an electronic ballast device for the control of gas discharge lamps. The device is comprised of a housing unit with electronic circuitry and related components. The device accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled.

U.S. Pat. No. 5,323,090 to Guy Lestician, the present inventor herein, is directed to an electronic ballast system including one or more gas discharge lamps which have two unconnected single electrodes each. The system is comprised of a housing unit with electronic circuitry and related components and the lamps. The system accepts a.c. power and rectifies it into various low d.c. voltages to power the electronic circuitry, and to one or more high d.c. voltages to supply power for the lamps. Both the low d.c. voltages and the high d.c. voltages can be supplied directly, eliminating the need to rectify a.c. power. The device switches a d.c. voltage such that a high frequency signal is generated. Because of the choice of output transformers matched to the high frequency (about 38 kHz) and the ability to change frequency slightly to achieve proper current, the device can accept various lamp sizes without modification. The ballast can also dim the lamps by increasing the frequency. The device can be remotely controlled. Because no filaments are used, lamp life is greatly extended.

U.S. Pat. No. 5,612,597 to Wood describes a circuit and method for driving a load such as a gas discharge illumination device from an ac main supply with a high power factor. The circuit includes a pair of electronic switches arranged in a half bridge configuration and a self oscillating driver circuit having two outputs for driving respective ones of the electronic switches, the electronic switches being coupled across a dc bus voltage and having a switched output coupled to the load. The circuit further includes a voltage regulator circuit coupled across the dc bus voltage and coupled to the self oscillating driver circuit, the voltage regulator circuit maintaining the dc bus voltage within a preset range and preventing the dc bus voltage from exceeding the range if the load is removed or becomes an open circuit. The voltage regulator preferably is a boost regulator switching an inductance. The circuit is particularly suitable for driving gas discharge illumination devices, e.g., fluorescent lamps, at a high power factor with minimum instability of the dc bus.

U.S. Pat. No. 7,312,582 B2 to Newman et al An electronic ballast for driving at least one lamp comprising a rectifying circuit operatively connectable to an AC line; a current drawing circuit connected across said rectifying circuit; and an inverter circuit connected to said rectifying circuit that supplies a lamp current to said at least one lamp; wherein said current drawing circuit draws current from said AC line when the instantaneous voltage of said AC line nears zero to reduce the total harmonic distortion of the input current drawn by said ballast.

U.S. Pat. No. 7,952,293 B2 to Kelly Power describes factor correction and driver circuits and stages. More particularly, power factor correction circuits are described that utilize an auxiliary inductor winding for power regulation. Driver circuits configured for electrical loads such as series arrangements of light emitting diodes are also described. An exemplary embodiment of a driver circuit can implement a comparator and/or a voltage regulator to allow for improved output current uniformity for high-voltage applications and loads, such as series configurations of LEDs. Embodiments of PFC stages and driver stages can be combined for use as a power supply, and may be configured on a common circuit board. Power factor correction and driver circuits can be combined with one or more lighting elements as a lighting apparatus.

U.S. Pat. No. 8,441,210 B2 to Shteynberg et al provides an apparatus, system and method for power conversion to provide power to solid state lighting, and which may be coupled to a first switch, such as a dimmer switch. An exemplary system for power conversion comprises: a switching power supply comprising a second, power switch; solid state lighting coupled to the switching power supply; a voltage sensor; a current sensor; a memory; a first adaptive interface circuit to provide a resistive impedance to the first switch and conduct current from the first switch in a default mode; a second adaptive interface circuit to create a resonant process when the first switch turns on; and a controller to modulate the second adaptive interface circuit when the first switch turns on to provide a current path during the resonant process of the switching power supply.

Thus, while there is extensive prior art in the ballast and LED lamp areas, none teaches an electronic ballast to power and control LED lamps, in the manner set forth herein. Notwithstanding the prior art, the present invention is neither taught nor rendered obvious thereby.

SUMMARY OF THE INVENTION

The present invention is directed to an electronic driver for providing light from both visible and invisible light bulbs, including infrared, ultraviolet, fluorescent and LED lamps, including LED lamps of multiple sizes and wattages. The present invention driver has power factor correction, surge protection, current sensing, current adjustment, and dimming capabilities, comprising: (a) a housing unit to mount electronic circuitry and related components; (b) electronic circuitry mounted on the housing unit, which includes: (i) connection means for connecting and applying a.c. power input to the circuitry; (ii) user control means for switching lamps on, off and dimming, controlling the circuitry; (iii) rectifying circuitry to convert a.c. power input to a plurality of d.c. outputs, including one or more low voltage outputs; (iv) power factor correction circuitry, including at least one power factor correction chip; (v) comparator circuitry which receives an external control signal and compares it to feedback from the output side of the circuitry, and thereby controls a Pulse Width Modulation (PWM) circuitry; (vi) said PWM circuitry which sends at least one timing signal to MOSFET gate driver circuit, and said PWM circuitry being functional to respond to dimming input of said user control means; (vii) said MOSFET gate driver circuit which receives said timing signal from PWM circuitry and supplies switching control to at least two secondary transistors; (viii) said at least two secondary transistors, which receive d.c. power from said rectifying circuitry and its doubler circuit and which are controlled by said MOSFET gate driver circuitry such that high frequency voltages are output; (ix) at least one gas-based lamp-dedicated isolation transformer, with the outputs of said transistors connected to the inputs of said gas-based-dedicated isolation transformers for driving fluorescent lamps; (x) at least one solid state lamp-dedicated isolation transformer, which receive d.c. power from said rectifying circuit, which are controlled by said MOSFET gate driver circuit, said at least one solid state lamp-dedicated isolation transformer being a receptacle-dedicated isolation transformer that is for dedication to a single solid state lamp receptacle connection for a single solid state lamp receptacle; (xi) at least one diode and one resistor located between said at least one solid state-dedicated, isolation transformer and a single lamp receptacle connection to which it is dedicated; (xii) lamp sensing circuitry receiving input from said rectifying circuitry to detect lamp wattage and to also separately detect lamp outage, and connected to adjustment circuitry to adjust for both wattage size and lamp outage, said lamp sensing circuitry to adjust power as needed to recognize and adjust to wattage requirements of different lamp sizes, and separately to at least partially decrease power when a lamp is experiencing outage.

In some embodiments of the present invention electronic driver for providing light from visible light bulbs and non-visible light bulbs, there is further included means to remotely control the switching on and off.

In some embodiments of the present invention electronic driver for providing light from visible light bulbs and non-visible light bulbs, there is further included the means to remotely control the driver such that the lamps may be dimmed by controlling the PWM circuitry.

In some embodiments of the present invention electronic driver for providing light from visible light bulbs and non-visible light bulbs, there is further included means to control the driver by a programmable timer and dimmer.

In some embodiments of the present invention electronic driver for providing light from visible light bulbs and non-visible light bulbs, there is a power factor control segment and a current sensing segment, and each of these segments includes at least one ground connected thereto.

In some embodiments of the present invention electronic driver for providing light from visible light bulbs and non-visible light bulbs, there is a solid state lamp that is an LED lamp.

In some embodiments of the present invention electronic driver for providing light from visible light bulbs and non-visible light bulbs, there are at least two solid state lamp-dedicated isolation transformers and at least two solid state lamp receptacles in parallel.

In some embodiments of the present invention electronic driver for providing light from visible light bulbs and non-visible light bulbs, there are at least two solid state lamp-dedicated isolation transformers and at least two solid state lamp receptacles in parallel and there are LED lamps connected to said at least two solid state lamp receptacles.

In some embodiments of the present invention electronic driver for providing light from visible light bulbs and non-visible light bulbs, there are at least four solid state lamp-dedicated isolation transformers and at least four solid state lamp receptacles in parallel.

In some embodiments of the present invention electronic driver for providing light from visible light bulbs and non-visible light bulbs, there is at least one gas-based lamp that is a fluorescent lamp.

In some embodiments of the present invention electronic driver for providing light from visible light bulbs and non-visible light bulbs, there is at least one gas-based lamp that is an ultraviolet lamp.

In some embodiments of the present invention electronic driver for providing light from visible light bulbs and non-visible light bulbs, there is at least one gas-based lamp that is an infrared lamp.

In some embodiments of the present invention electronic driver for providing light from visible light bulbs and non-visible light bulbs, the rectifying circuit includes a snubber unit that includes at least one rectifier.

In some embodiments of the present invention electronic driver for providing light from visible light bulbs and non-visible light bulbs, the driver includes an in-driver rechargeable 12 volt battery, alternating current power failure recognition, and 12 volt switch responsive to sensing alternating current power failure for 12 volt solid state powering.

In some embodiments of the present invention electronic driver for providing light from visible light bulbs and non-visible light bulbs, the driver includes a zeta scan component connected to said electronic circuitry mounted on said housing unit.

In some embodiments of the present invention electronic driver for providing light from visible light bulbs and non-visible light bulbs, the zeta scan component includes: (i) connection means for connecting and applying a.c. power input to said zeta scan component; (ii) at least one frequency timer; (iii) at least one input comparator connected to said frequency timer; (iv) at least one output comparator connected to said frequency timer; and, (v) a plurality of resistors and capacitors situated between said input comparator and said frequency timer, and at least one resistor and at least one capacitor situated between said frequency timer and said input comparator. Additionally, the zeta scan may be employed with other electronic lamp drivers outside the scope of those provided herein and still be within the present invention.

In some embodiments of the present invention electronic driver for providing light from visible light bulbs and non-visible light bulbs that include zeta scans, there is at least one solid state lamp receptacle and at least one solid state lamp in said receptacle, said lamp being selected from a single end screw-in bulb, a single end pin connector bulb and a dual connector elongated lamp having connectors at opposing ends.

In some embodiments of the present invention electronic driver for providing light from visible light bulbs and non-visible light bulbs that include zeta scans, there is means to remotely control said switching on and off.

In some embodiments of the present invention electronic drivers that include zeta scans, the driver further includes means to remotely control the driver such that said lamps may be dimmed by controlling the PWM circuitry.

In some embodiments of the present invention electronic driver for providing light from visible light bulbs and non-visible light bulbs that include zeta scans, the driver, further includes means to control the driver by a programmable timer and dimmer.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The present invention will be more fully understood when the present specification is taken in conjunction with the appended drawings, wherein.

DETAILED DESCRIPTION OF THE INVENTION

The present invention relates to multifunctional drivers that may be used for visible and invisible lighting, including LEDs, fluorescents, ultraviolets and infrareds and others. These present invention multi-wavelength controllers (drivers), may be used for lighting with: (1) specific single wave length; (2) multiple separate wave lengths; (3) complete wave length segment inclusion (e.g., 200 to 400 megahertz); and, in preferred embodiments, also: (4) cycling multiple separate wave lengths (using a zeta scan component); and (5) cycling complete wave length segment inclusion (e.g., 200 to 400 megahertz) (using a zeta scan component). Thus, for example, the present invention multitasking drivers may be programmed to illuminate every wavelength in a particular lighting segment of wavelengths or all of them, and with the zeta scan component, may repeat the foregoing cyclically at a specified or varied periodicity. In addition, the present invention drivers provide the unique capability of programming a specific group of specific wavelengths and for variable intensities for a particular sequential pattern. For example, it could be for destroying, inactivating or sterilizing a particular pathogen with ultraviolet light as follows: three pathogen-specific wavelengths are programmed to be illuminated, e.g., 175, 212 and 333 um. Then, these are programmed to sequentially increase and then reduce intensity for specific time intervals, using the zeta scan component that has frequency timer(s). Thus, 212 um may be increased in intensity threefold (and then reduced) in intensity to crack open or "wound" a pathogen and then the other wave lengths may sequentially be intensified temporarily to burn or "kill" the pathogen organism.

Further, the present invention devices provide for power factor control, voltage regulation, surge protection, current sensing and current adjustment, and will operate with varying sizes and wattage lamps. (The term "bulb" and "lamp" and "light" and "lighting" are used herein interchangeably and should be taken to mean one or more LEDs or other solid state lamps used to generate light and/or one or more fluorescent bulbs or other gas bulbs, e.g., single, multiple or combinations of LEDs, fluorescent bulbs, ultraviolet bulbs or other wave length bulbs. The terms "ballast" and "controller" and "driver" are likewise used herein interchangeably to mean the same or different devices to control lighting). While some less sophisticated electronic ballasts offer some benefits over other lighting techniques, such as lower energy use for comparable light output, these ballasts still waste energy through excessive heat generation, they lack the features available with the present invention and the life of the lamp is limited because of failure of the prior art ballasts to adjust power input when one or more lamps burn out or otherwise fails. Standard ballasts use energy wasting transformers to create a higher voltage, low frequency signal to activate the LED lamps. The present invention uses a lower voltage, high frequency signal to control power and to respond rapidly to change feedback. Existing ballasts require specific impedance matching to a specific lamp design. The present invention can power a wide range of lamp sizes without modification. Most uniquely, in the present invention drivers, the LEDs and fluorescents are interchangeable and in those embodiments with a plurality of fixture (receptacles), one or more LED lamps and one or more fluorescent lamps may be driven simultaneously.

Using the present invention, lamps will burn cooler, last longer and produce a brighter light while using less electricity. The present invention also has a more sophisticated level of control then is available from the present state of the art. It can dim the lamps, delay power-up to improve lamp life, sense when a lamp is missing and respond accordingly by reducing power or shutting down completely, and it can be controlled remotely or by a programmable unit. The present system is also able to light its lamps at extremely low temperatures (e.g., below −10 degrees Fahrenheit) because there is no need to pre-heat the filament elements. The present invention devices are also able to simulate Earth's sunset and sunrise light changes by slow, smooth transitional dimming and brightening over specified time frames.

The present invention is directed to an electronic driver system (a driver and related circuitry) for the control of a variety of lamps. It accepts a. c. power and rectifies it into various low d. c. voltages to power the electronic circuitry, and by use of various circuits to one or more high d.c. voltages to supply power for the lamps. Both the low d. c. voltages and the high d. c. voltages can be supplied directly, eliminating the need to rectify a.c. power.

The high voltage d. c. power is applied to a MOSFET which is controlled by a Pulse Width Modulation [P.W.M.] circuit which outputs two pulse trains 180 electrical degrees out of phase with each other. The PWM circuit and MOSFET gate driver (transistor) controls switching circuitry which switches the MOSFET such that a high frequency output is fed into one or more output transformers and to the lamps that are recognized as fluorescent or other forms of lighting, e.g., x-ray, UV, LED or any other gas bulb or solid state lighting. Additionally, outputs from the same sources pass through solid state lighting-dedicated iterative transformers. Power from the output side of each of these transformers is fed to one or more sets of capacitors and diodes and then to the solid state, e.g., LED lamps. The PWM circuit thus controls the frequency which is supplied to the lamps.

The electrical characteristics of the transformers and the impedance of the circuit are chosen so that two important features are derived. The transformer operates in its "high frequency zone" where an increase in frequency, with voltage held nearly constant, will cause a decrease in output current. This allows for the ballast to dim the lamps by increasing the frequency. Secondly, in this region of operation the reactance values of the transformer primary windings and the transformer secondary windings become significant. Because reactance is proportional to frequency, with a steady state operating frequency of about 38 kHz, these values are large. When different lamps are installed, the impedance of the lamp becomes part of the overall impedance reflected back to the MOSFETs. As lamp current increases, the resistance of the lamp decreases allowing for a further current increase. The overall impedance of the output transformers coupled with the impedance of the lamp with a frequency change acts to limit the lamp current. For any of the lamp sizes installed, a different, steady-state operating point for current and frequency is achieved when voltage is held nearly constant. It is the phenomenon of the transformer characteristics at the design nominal operating frequency which allow different lamp loads to be powered without rewiring or component change. The frequency of the voltage applied to the LED and/or fluorescent lamps causes the lamps to light. The present invention can dim its lamps by increasing the frequency inputted to the transformers thereby causing the output current to lower while the voltage is held constant. As the current decreases, the lamps dim. Thus, it can be seen that the selection of the operating frequency and corresponding frequency response of the output transformer are critical in the design of the present device.

If one or more lamps is removed or fails, the device will sense this and either shut down completely or decrease total output power to the remaining lamps as required. The present device operates with a higher efficiency than conventional ballasts and higher than most electronic ballasts and drivers in large part because of the higher frequency and correspondingly smaller output transformers required.

Another unique feature in preferred embodiments is the optional in-driver 12 volt battery that is monitored and trickle-charged by the system for automatic switching to the 12 volt power, should the normal a.c. voltage power source fail. In this case, the in-driver battery will power any LEDs installed in the system.

Figure 1A:
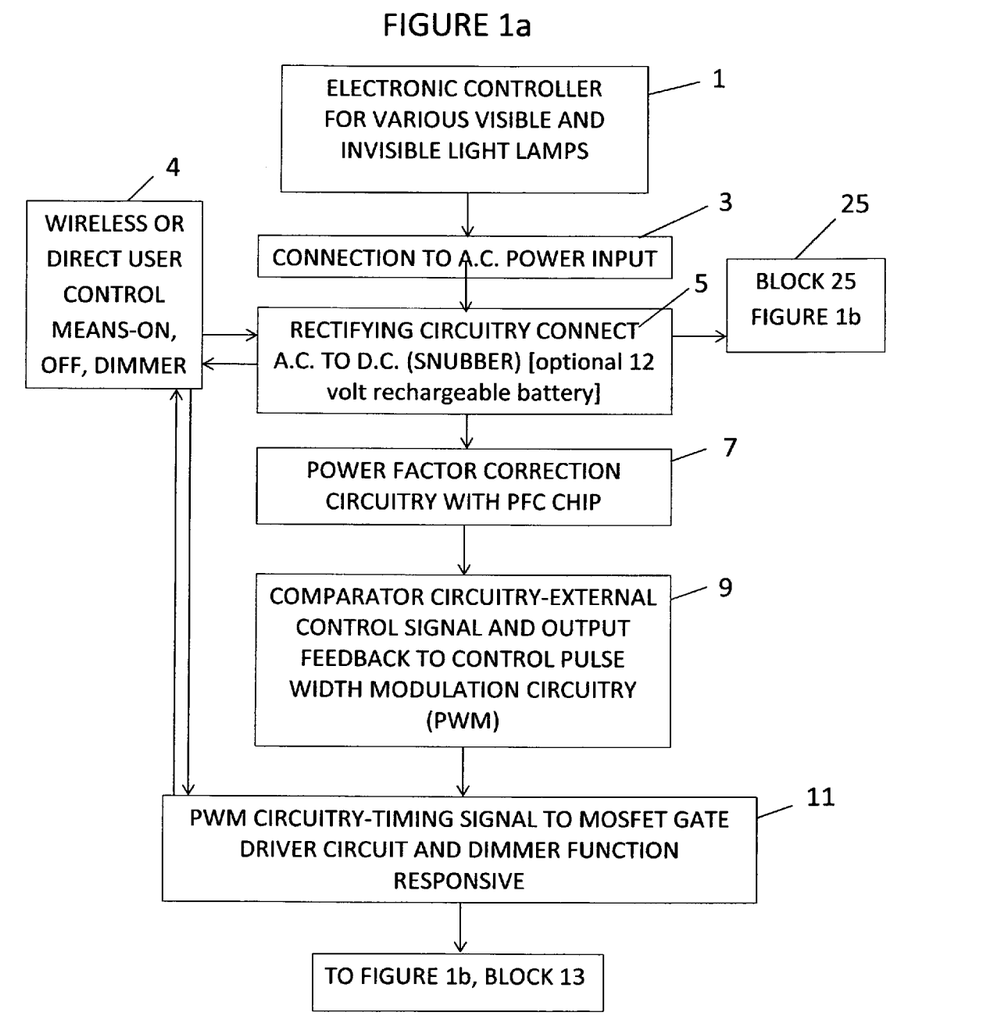
FIGS. 1a and 1b collectively illustrate a flow diagram of the electrical process of preferred embodiments of the present invention.
Figure 1B:
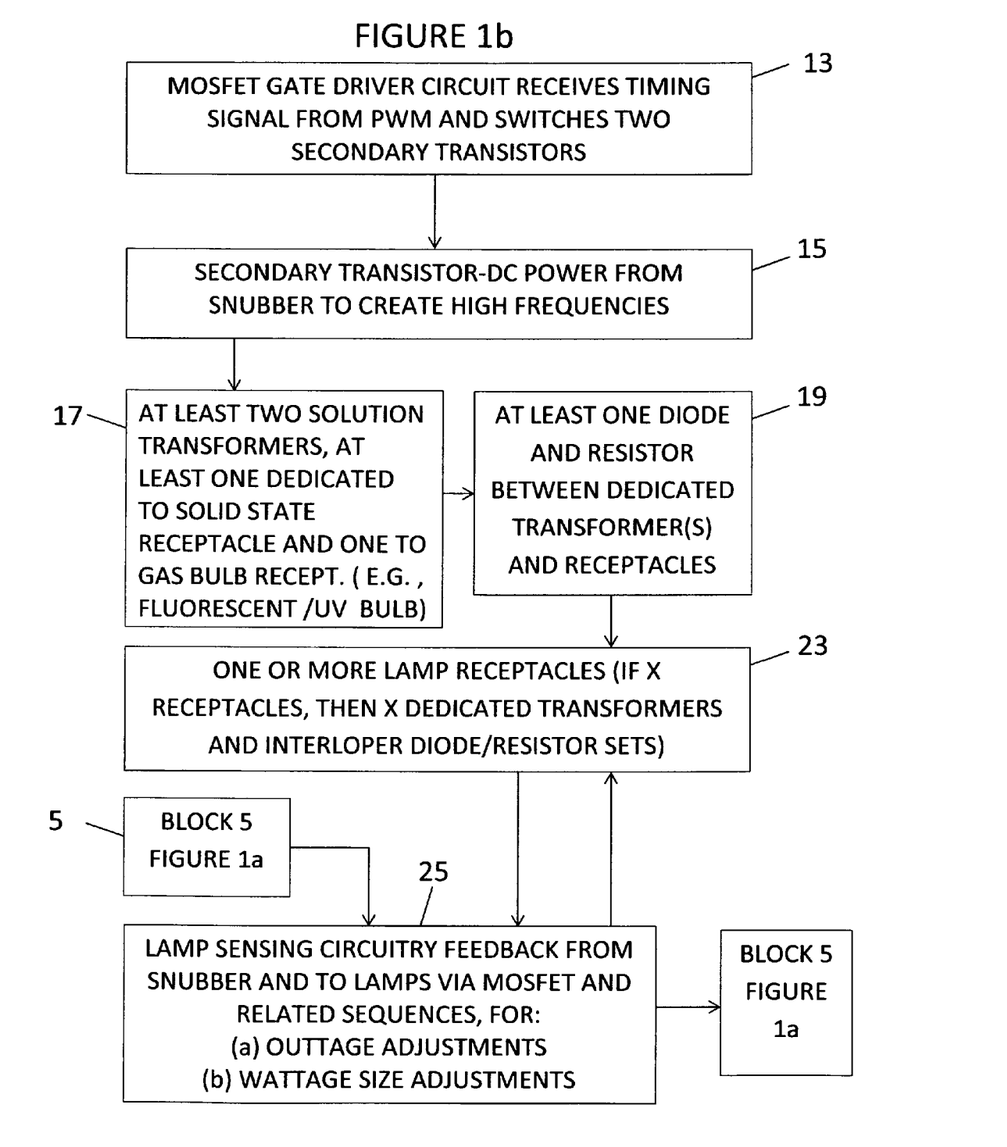

The flow chart in FIGS. 1a and 1b presents one embodiment of the present invention multisize LED/fluorescent lamp, infrared, ultraviolet and other visible and invisible light bulb driver with power factor correction, current sensing and current adjustment. In this configuration, the electronic controller1 has an input of a.c. power 3 by means of a neutral lead and a hot lead (for example, 120 volts in the embodiments shown in the Figures below). The device has the connection means to connect to the a.c. power 3. The a. c. power is input to the rectifier section 5. A control means 4 for dimming and turning the d. c. power off and on may be a remote control device or a wired device and this control means 4 is connected wirelessly or by wire, to the rectifying circuitry 5 and to the MOSFET gate driver circuit 11, discussed below. There is also a power factor correction circuitry 7 with a PFC chip, as shown.

The rectifier 5 performs several functions. It rectifies the a. c. power 3 into various low d. c. voltages as required to power the electronic circuitry of the driver 1. The rectifier 5 also converts the a.c. power into a high voltage d.c. power. This power is converted by the rectifier and the subsequent circuitry shown from the a.c. voltage into the d.c. power voltage. The circuit then supplies d.c. power and ground to at least two secondary transistors 15. The switching of these secondary transistors are controlled by MOSFET gate driver circuitry 13 which in turn is controlled by the Pulse Width Modulated [PWM] circuit 11, as shown in this Figure. The transistors are fired alternatively between the high voltage and ground, at 180 electrical degrees apart such that a high frequency output is fed into the input of one or more isolation transformers 17 which see a high frequency symmetrical, alternating signal relative to the neutral lead which, with filtering, approaches a sinusoidal wave. The outputs of the isolation transformers 17 are fed to the lamp receptacles 23 but only after passing through control diode/resistor sets.

One or more lamps may be connected to the system with a dedicated isolation transformer and control interloper for each receptacle.

There is also an output of each of the transformers, which is connected to the comparator circuit 9 described as follows. The comparator circuit 9 receives an externally generated control signal and compares this signal to feedback signals from the outputs of the transformers 17. The control signal can turn the device on and off or can control dimming of the lamps. The comparator circuit 9 inputs timing signals to the PWM circuit 11. This PWM circuit 11 sends the timing signals to the MOSFET gate driver 13. By controlling the firing of the secondary transistors 15, the output of these transistors will be a voltage wave form of variable frequency, for subsequent, controlled operation of connected lighting. The higher frequency voltage powers the lamps causing them to light. By changing the frequency slightly, proper operating conditions will be achieved. By increasing the frequency, the lamps can be dimmed. By preventing the firing of the MOSFETs 15, the lamps are shut off completely.

There is a lamp sensing circuit 25 which can detect a fault and can recognize different lamp wattages and make instantaneous changes to power based on (a) bulb failure; (b) lamp changes with different wattage requirements; and (c) combinations of the two. A power signal from the rectifier 5 and feedback signals from the lamps 23 are input to the lamp sensing circuit 25 which senses the current draw of the lamps. The lamp sensing circuit 25 feeds into the comparator circuit 9 which detects when a fault occurs. A fault occurs when one or more lamps are missing, causing a load change, thereby changing the current draw of the load. If such a fault is detected, the comparator circuitry fault detector causes the MOSFET gate driver 13 to change the signals to the secondary transistors 15 switching circuits so that power to the lamps is decreased or completely shut off, as needed to optimize the lighting functionality, both from the standpoint of efficient power usage and from the stand point of consistent lighting (even illumination).

Figure 2:
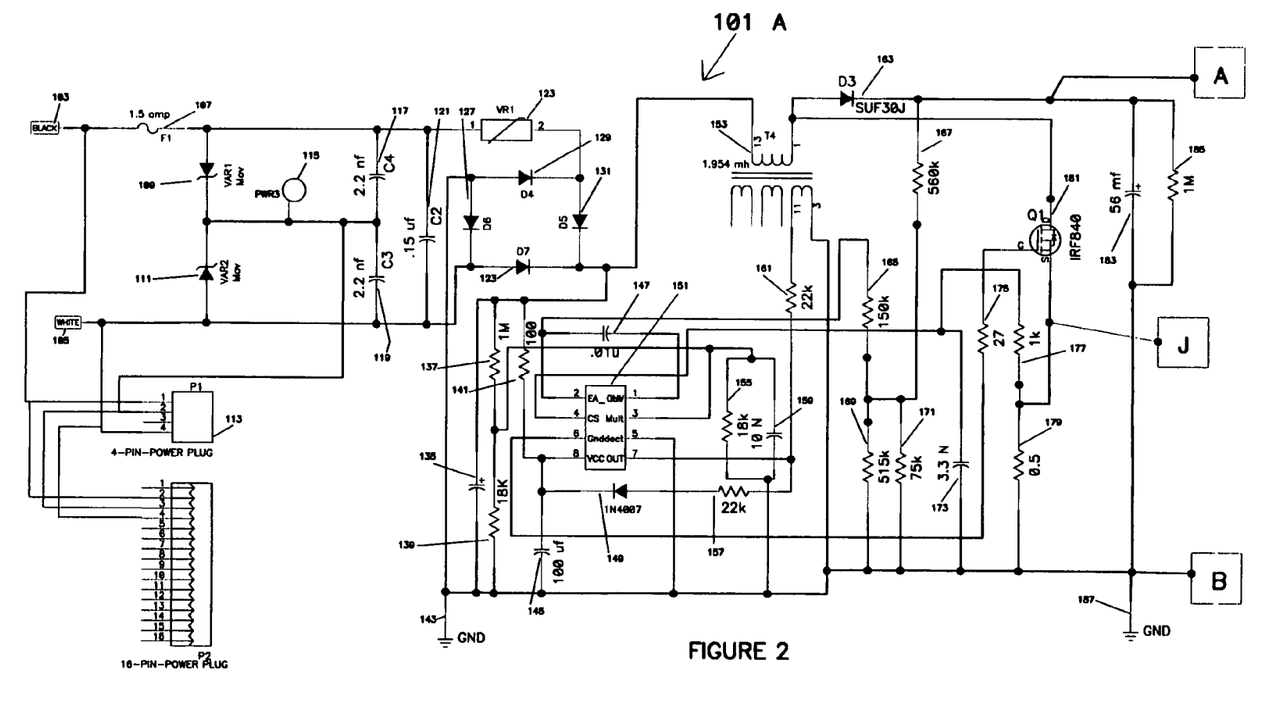
FIGS. 2, 3 and 4 individually represent segments and collectively represent a complete circuitry for one preferred embodiment of the present invention showing the detailed interrelationships of the various components.

Referring now to FIG. 2, a schematic diagram 101a shows details of a first segment of circuitry of one preferred embodiment of the present invention. Connections 103 and 105 show the 120V a.c. mains input. This a.c. signal is used in three ways: To supply high voltage bias to a power switching network, to be used in a 12V power supply, and to be used as an offset voltage in the transformer network. This FIG. 2 diagram 101a is only a portion of the circuitry of this present invention embodiment, as this FIG. 2 circuitry is connected to the FIG. 3 circuitry, which is in turn connected to the FIG. 4 circuitry. This FIG. 1 circuitry includes input connections, fuse, voltage control and power factor control, as well as other features. The specific components are arranged as shown and their specific types and values are shown in Table 1 below:

TABLE 1

The FIG. 2 Section Components

| Reference | Item | Value | Units |
|---|---|---|---|
| 103 | A.C. Input Line | 120 | Volts |
| 105 | A.C. Input Line | 120 | Volts |
| 107 | Fuse | 1.5 | amps |
| 109 | Zener Diode | 1N4733 | |
| 111 | Zener Diode | 1N4733 | |
| 115 | PWR | | |
| 113 | Power Plug Pin Array | Plug | |
| 117 | Capacitor | 2.2 nf | |

TABLE 1-continued

The FIG. 2 Section Components

| Reference | Item | Value | Units |
|---|---|---|---|
| 119 | Capacitor | 2.2 nf | |
| 121 | Capacitor | .15 uf | |
| 123 | Metal Oxide Varistor | Pepi | clamping fuse |
| 125 | Diode | 1N4007 | |
| 127 | Diode | 1N4007 | |
| 129 | Diode | 1N4007 | |
| 131 | Diode | 1N4007 | |
| 133 | Diode | 1N4007 | |
| 151 | Ballast chip | FAN7711 OR EQUIVLENT | |
| 139 | Resistor | 18K | |
| 141 | Resistor | 100 Ohm | |
| 143 | Ground | 0 Ohm | |
| 145 | Capacitor | 100 uf | |
| 147 | Capacitor | .01 uf | |
| 149 | Diode | 1N4007 | |
| 151 | Ballast chip | FAN7711 | |
| 153 | Inductor | 2.5 mH | |
| 155 | Resistor | 18k | |
| 157 | Resistor | 22k | |
| 159 | Capacitor | 10 nf | |
| 161 | Resistor | 22k | |
| 163 | Diode | SUF30J | |
| 165 | Resistor | 150k | |
| 167 | Resistor | 560k | |
| 169 | Resistor | 515k | |
| 171 | Resistor | 75k | |
| 173 | Capacitor | 3.3 nf | |
| 175 | Resistor | 27 Ohm | |
| 177 | Resistor | 1k | |
| 179 | Resistor | .5 Ohm | |
| 181 | MOSFET | IRF840 | |
| 183 | Capacitor | 56 Mf | |
| 185 | Resistor | 1M | |
| 187 | Ground | 0 Ohm | |
| 189 | Resistor | 1k | |

Figure 3:
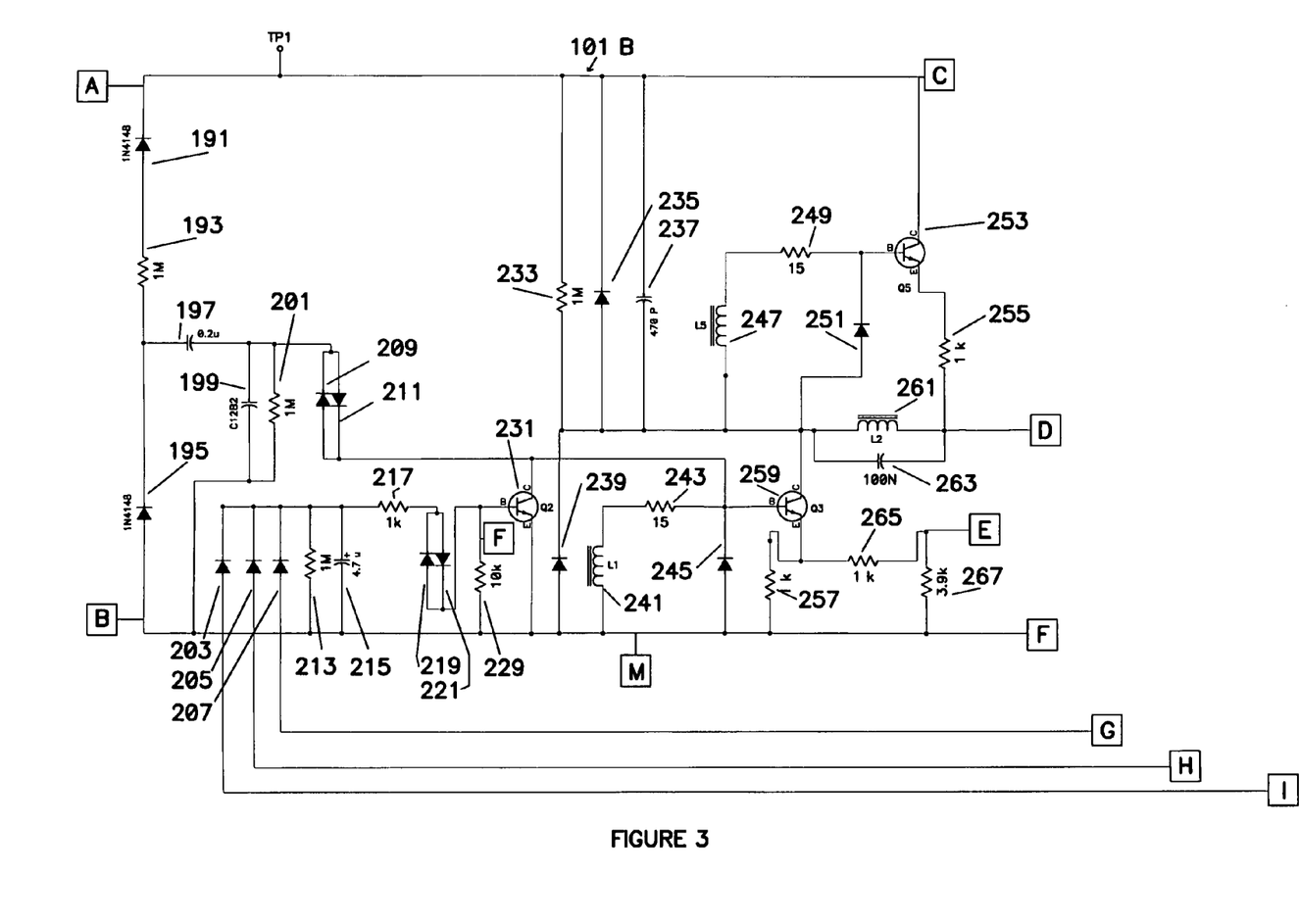
Figure 4:
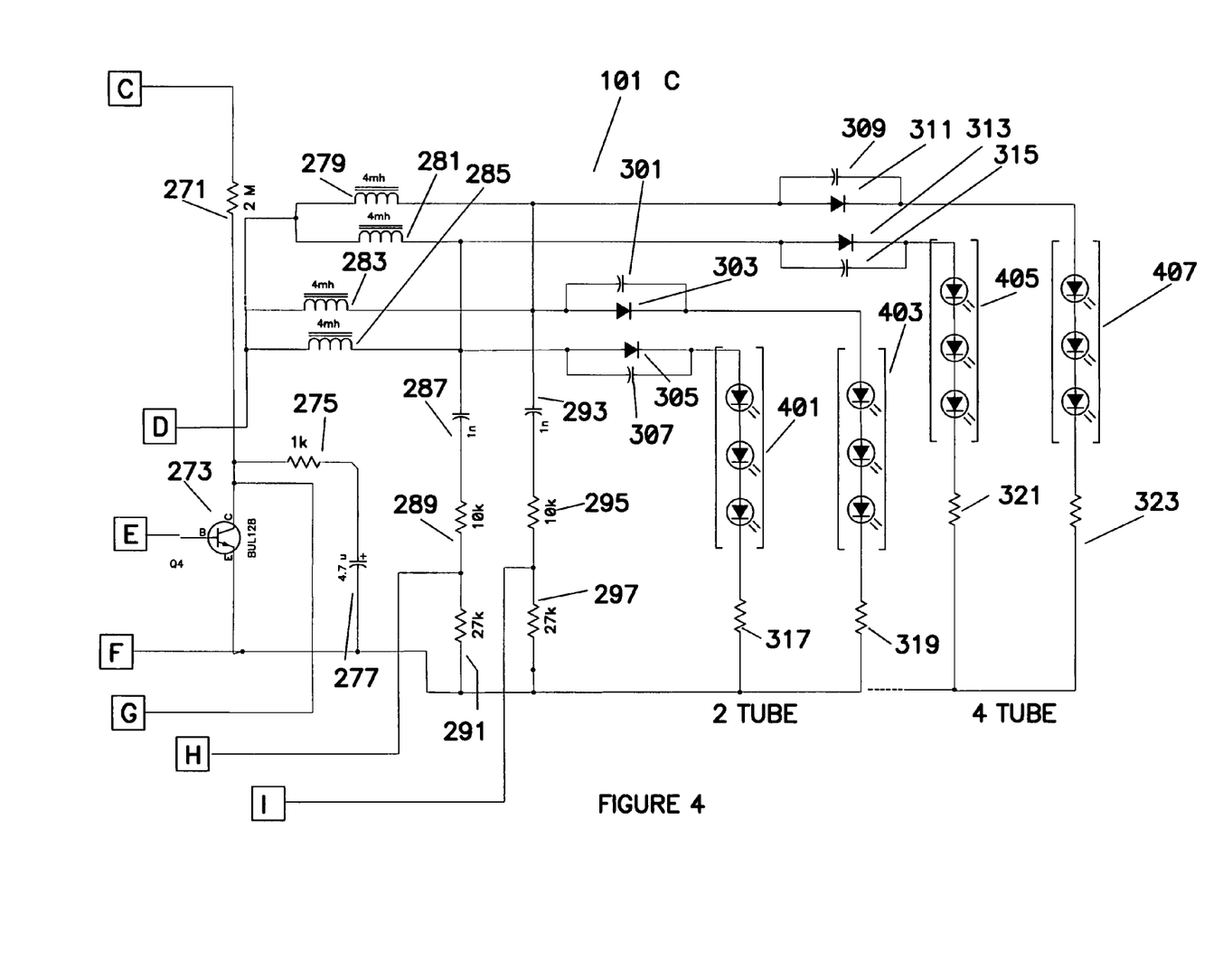

In FIG. 2, at the end of the circuitry segment schematic diagram 101a are figure connectors A and B that match up to connectors A and B of FIG. 3, and other connectors of FIG. 3 match up with connectors of FIG. 4. Thus, these three Figures should be taken together a one full circuitry arrangement for a preferred present invention embodiment and the connections are for diagrammatic clarity only.

Referring now to FIG. 3, a schematic diagram 101b shows details of a second segment of a preferred embodiment of the present invention, wherein the first segment is set forth in FIG. 2 above and the third segment is presented in FIG. 4 below. This middle segment shows various essential features and highlights most of the current sensing and current adjustment aspects of the invention. The specific components are arranged as shown and their specific types and values are shown in Table 2 below:

TABLE 2

The FIG. 3 Section Components

| Reference | Item | Value | Units |
|---|---|---|---|
| 191 | Diode | 1N4001 | |
| 193 | Resistor | 1M | |
| 195 | Diode | 1N4148 | |
| 197 | Capacitor | .2 uf | |
| 199 | Capacitor | .1 uf | |
| 201 | Resistor | 1M | |
| 203 | Diode | 1N414 | |
| 205 | Diode | 1N4148 | |
| 207 | Diode | 1N4148 | |
| 209 | Diode | 1N4148 | |

TABLE 2-continued

The FIG. 3 Section Components

| Reference | Item | Value | Units |
|---|---|---|---|
| 211 | Diode | 1N4148 | |
| 213 | Resistor | 1M | |
| 215 | Capacitor | 4.7 uf | |
| 217 | Resistor | 1k | |
| 219 | Diode | 1N4148 | |
| 221 | Diode | 1N4148 | |
| 229 | Resistor | 10k | |
| 231 | Transistor | 2N3904 | |
| 233 | Resistor | 1M | |
| 235 | Diode | 1N4148 | |
| 237 | Capacitor | 470Pf | |
| 239 | Diode | 1N4148 | |
| 241 | Inductor | 8 | mH |
| 243 | Resistor | 15 | Ohm |
| 245 | Diode | 1N4148 | |
| 247 | Inductor | 3 | mH |
| 249 | Resistor | 15 | Ohm |
| 251 | Diode | 1N4148 | |
| 253 | Transistor | 2N3904 | |
| 255 | Resistor | 1k | |
| 257 | Resistor | 1k | |
| 259 | Transistor | 2N3569 | |
| 261 | Inductor | 5 | mH |
| 265 | Resistor | 1k | |
| 267 | Resistor | 3.9k | |

In FIG. 3, at the right end of the circuitry segment schematic diagram 101b are figure connectors C, D, E, F, G, H and I that match up to connectors C, D, E, F, G, H of FIG. 4, and other connectors of FIG. 3 match up with connectors of FIG. 2 described above. Thus, these three Figures should be taken together a one full circuitry arrangement for a preferred present invention embodiment and the connections are for diagrammatic clarity only.

Referring now to FIG. 4, a schematic diagram 101c shows details of a third segment of a preferred embodiment of the present invention, wherein the first segment is set forth in FIG. 2 above and the second segment is presented in FIG. 3 above. This end segment shows various essential features and highlights most of the output and feedback portions of the invention. The specific components are arranged as shown and their specific types and values are shown in Table 3 below:

TABLE 3

The FIG. 4 Section Components

| Reference | Item | Value | Units |
|---|---|---|---|
| 271 | Resistor | 2M | |
| 273 | Transistor | BUL126 | |
| 275 | Resistor | 1k | |
| 277 | Capacitor | 4.7 mf | |
| 279 | Inductor | 4 | mH |
| 281 | Inductor | 4 | mH |
| 283 | Inductor | 4 | mH |
| 285 | Inductor | 4 | mH |
| 287 | Capacitor | 1 | nf |
| 289 | Resistor | 10k | |
| 291 | Resistor | 27k | |
| 293 | Capacitor | 1 | nf |
| 295 | Resistor | 10k | |
| 297 | Resistor | 27k | |
| 301 | Capacitor | .1 uf | |
| 303 | Diode | 1N4148 | |
| 305 | Diode | 1N4148 | |
| 307 | Capacitor | .1 uf | |
| 309 | Capacitor | .1 uf | |
| 311 | Diode | 1N4148 | |

TABLE 3-continued

The FIG. 4 Section Components

| Reference | Item | Value | Units |
|---|---|---|---|
| 313 | Diode | 1N4148 | |
| 315 | Capacitor | .1 uf | |
| 317 | Resistor | .5 | Ohm |
| 319 | Resistor | .5 | Ohm |
| 321 | Resistor | .5 | Ohm |
| 401 | $1^{st}$ LED or other solid state light | | |
| 403 | $2^{nd}$ LED or other solid state light (optional, in paralle) | | |
| 405 | $3^{rd}$ LED or other solid state light (optional, in parallel) | | |
| 407 | $4^{th}$ LED or other solid state light (optional, in parallel) | | |

The details shown may be modified to be consistent with the arrangements and purposes set forth herein above and below, without exceeding the scope of the present invention. For example, the values of the various specific components could be adjusted up or down until less than desirable functionality is achieved. Printed chips may replace some of the components listed in any of the above tables, if the inputs, outputs and functions are the same. The power factor correction chip could be supplanted by individual pre-chip components; the positioning of the power factor correction circuitry could be rearranged (positioned elsewhere in the circuit) in a different loop and still make corrections as needed. However, other aspects, such as the interlopers of the dedicated transformers, are essential in that position (between the transformers and the LED lamp receptacles.

Figure 5:
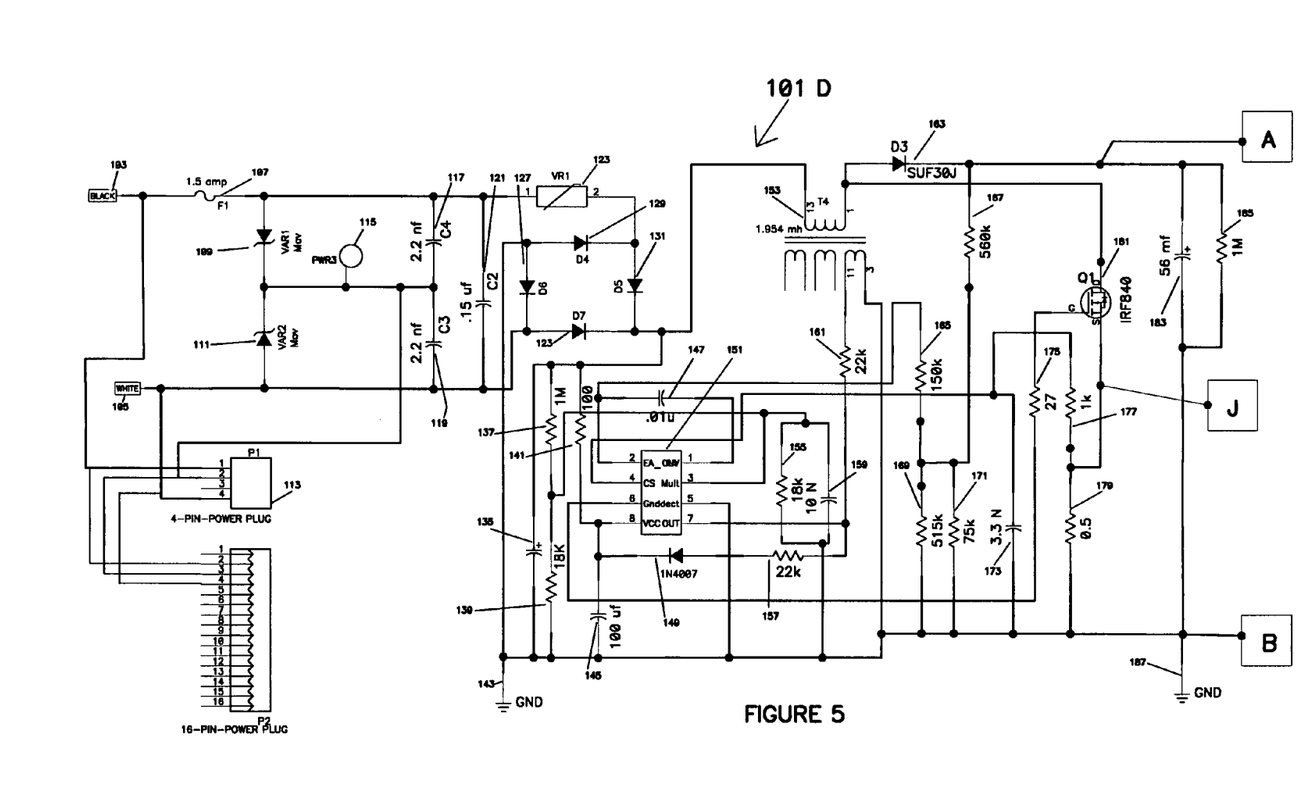
FIGS. 5 and 6 are the same as FIGS. 2 and 3 above, except that connections are positioned and shown for attachment of a zeta scan component, and FIGS. 5, 6, and FIG. 4 above, individually represent segments and collectively represent a complete circuitry for another preferred embodiment of the present invention showing the detailed interrelationships of the various components; and, FIG. 7 represents a present invention zeta scan component that is attached to the connections shown in FIGS. 5 and 6 above.
Figure 6:
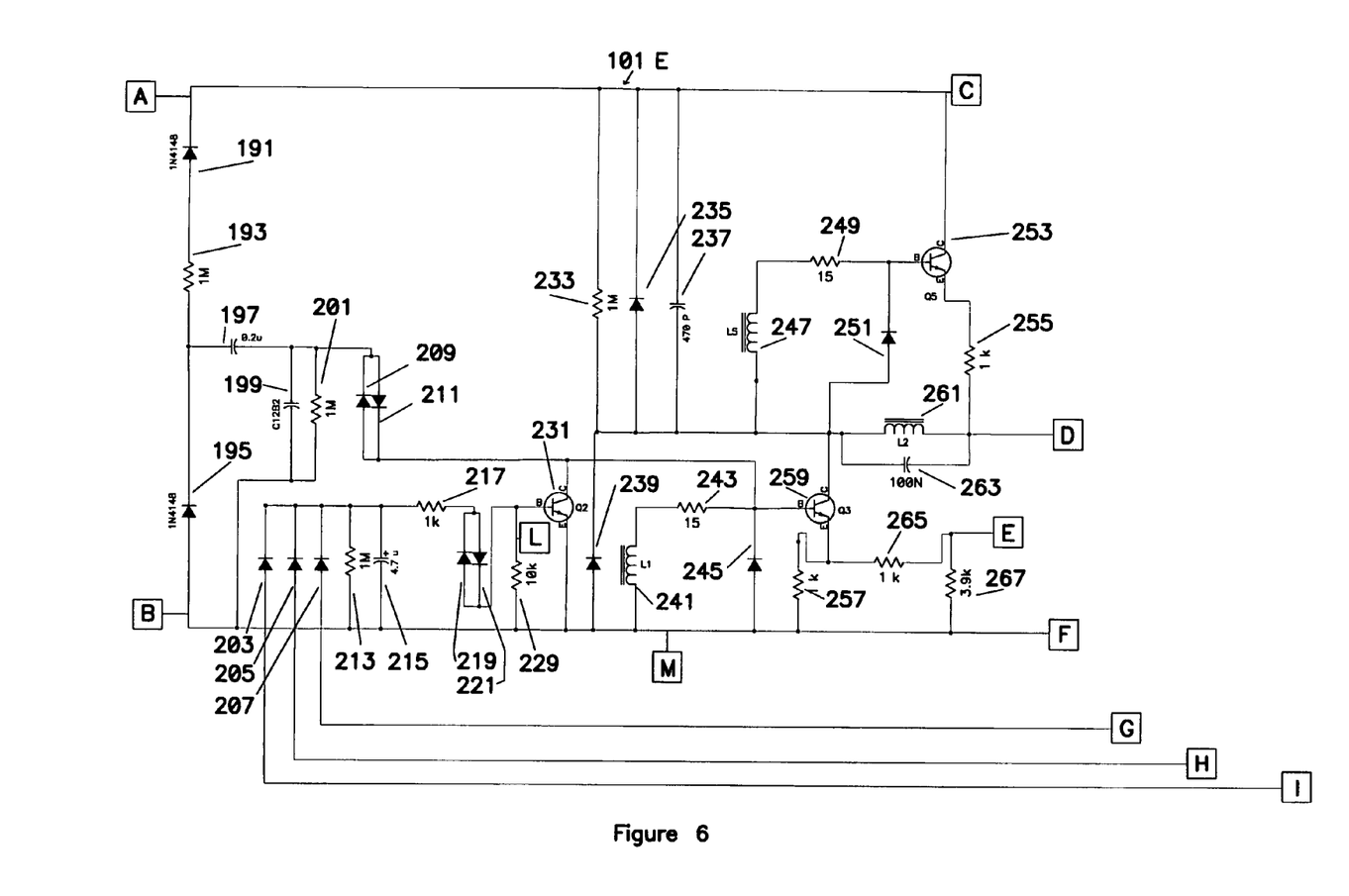
Figure 7:
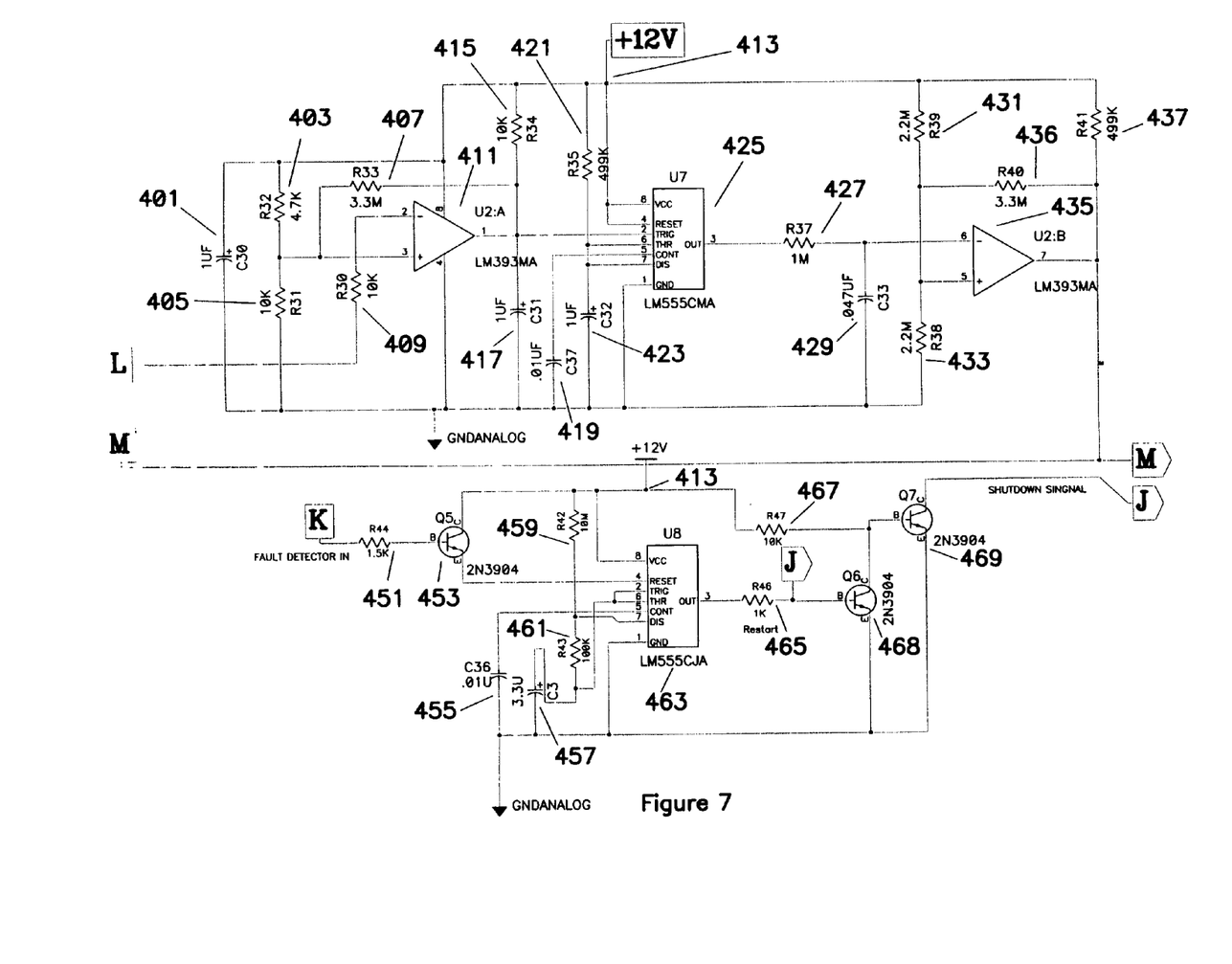

FIGS. 5 and 6 are the same as FIGS. 2 and 3 above, except that connections are positioned and shown for attachment of a zeta scan component, and FIGS. 5, 6, and FIG. 4 above, individually represent segments and collectively represent a complete circuitry for another preferred embodiment of the present invention showing the detailed interrelationships of the various components, and FIG. 7 represents a present invention zeta scan component that is attached to the connections shown in FIGS. 5 and 6 above.

FIG. 5 generally shows a segment of a present invention embodiment as schematic 101d, being the same as schematic 101a of FIG. 2 above, with identical components being identically numbered, except that in this FIG. 5 there are two connections (wiring connections that are temporary or permanent or are plug connections), shown as connection J and connection K, both being connected to the feedback aspects of the circuit and adapted for connection to the zeta scan component shown in FIG. 7 below.

FIG. 6 generally shows a segment of a present invention embodiment as schematic 101e, being the same as schematic 101b of FIG. 3 above, with identical components being identically numbered, except that in this FIG. 5 there are two connections (wiring connections that are temporary or permanent or are plug connections), shown as connection L, connected to the control aspects of this circuitry, and connection M, connected to the ground aspects of the circuitry and both are adapted for connection to the zeta scan component shown in FIG. 7 below.

FIG. 7 represents a present invention zeta scan component that is attached to the connections shown in FIGS. 5 and 6 above. By "zeta component" is meant a combination of electrical elements that make up a circuit portion that may be preprogrammed and set at manufacture or subsequently programmed and set, or subsequently programmed and be open to reprogramming, to offer the programmer choices of cycling a programmed or programmable group of wave lengths, or cycling a programmed or programmable all inclusive wavelength segment such as 150 nm to 700 nm. By cycling is meant any one or more of: (1) going from smaller to higher wavelengths and repeating, (2) going from higher to smaller wavelengths and repeating, (3) going from smaller to higher wavelengths and then from higher to smaller wavelengths or vice versa, and repeating, or (4) going through a series of unordered wavelengths and repeating (e.g., 180 nm, 220 nm, 192 nm, 320 nm, repeating). In essence, any zeta scan component that is able to perform the foregoing in conjunction with the earlier Figure circuitry may be used herein. However, the preferred embodiment zeta scan components have the following circuit arrangements: timers, comparators, transistors and properly rated resistors and capacitors. Referring specifically to FIG. 7, there is shown connections J, K, L and M that are the connecting portions to the same connections of FIGS. 5 and 6 above. As mentioned, these could be any connection, such as hard wired, temporarily wired or plug-ins, clips or any other known electrical connecting means, although plugs are preferred if the present invention devices are being produced with and without the zeta scan component. This zeta scan segment shows various essential elements of the zeta scan used in some preferred embodiments of the present invention. The specific components of Figure Tare arranged as shown in the Figure and their specific types and values are shown in Table 4 below:

TABLE 4

The FIG. 7 Section Components (zeta scan)

| Reference | Item | Value | Units |
|---|---|---|---|
| 401 | LED Set 1 | Array Tube | |
| 403 | LED Set 2 | Array Tube | |
| 405 | LED Set 3 | Array Tube | |
| 407 | LED Set 4 | Array Tube | |
| 409 | Resistor | 10k | |
| 411 | Comparator, | LM393N | |
| 413 | 12 volt connection | | |
| 415 | Resistor | 10k | |
| 417 | Capacitor | 1 | mF |
| 419 | Capacitor | .01 | uf |
| 421 | Resistor | 499k | |
| 423 | Capacitor | 1 | mF |
| 425 | Frequency Timer, | LM555N | |
| 427 | Resistor | 1M | |
| 429 | Capacitor | .047 | uf |
| 431 | Resistor | 2.2M | |
| 433 | Resistor | 2.2M | |
| 435 | Comparator | LM393N | |
| 437 | Resistor | 499k | |
| 451 | Resistor | 1.5k | |
| 453 | Transistor | 2N3904 | |
| 455 | Capacitor | .01 | uf |
| 457 | Capacitor | 3.3 | uf |
| 459 | Resistor | 10M | |
| 461 | Resistor | 1M | |
| 463 | Frequency Timer | LM555N | |
| 465 | Resistor | 1k | |
| 467 | Transistor | 2N3904 | |
| 469 | Transistor | 2N3904 | |

The present invention can achieve great energy savings in office buildings, schools, hospitals and industrial plants or any other location where there are large banks of lights. Not only does this type of application where there are so many lamps benefit from great energy savings, but it benefits from the ability to remotely and precisely control the output of the lamps and will greatly benefit from the extended life of the lamps. Also, since not all lamps in such a location will necessarily be of the same type, the user will benefit from the ability to interchange bulb types with differing wattages and other aspects, without requiring rewiring or modification.

In addition, the present invention can be extremely beneficial for controlling other ranges of lighting and types of lighting, including visible and invisible, such as ultraviolet and infrared light. One particular advantageous application, for example, is in the many uses of ultraviolet light, including for treatments such as sanitization, sterilization, and reduction or elimination of airborne, surface or liquid pathogens and other undesirables, such as Ebola, SARS, Influenza, *Clostridium Difficile*, Norovirus, Enterovirus treatment and other pathogen bacteria and virus treatments.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. Preprogramming and programming of the present invention devices may be achieved by any workable methods within the skill of the artisan, and include remote control programming (wireless), programmable chips, DMX 512 technology, potentiometers, computer or laptop plug-in programming with appropriate software, as well as combinations thereof.

What is claimed is:

1. An electronic driver for providing light from visible light bulbs and non-visible light bulbs, including gas-based lighting and solid state lighting, and including ultraviolet light bulbs, x-ray lamps, infrared light bulbs, LED bulbs and fluorescent bulbs, wherein these bulbs are interchangeable, and said driver is programmable and auto-adjustable for different wattages to permit use of different size and intensity lamps therewith, the driver having power factor correction, surge protection, current sensing, and current adjustment, and dimming capabilities, comprising:
(a) a housing unit to mount electronic circuitry and related components;
(b) electronic circuitry mounted on said housing unit, which includes:
(i) connection means for connecting and applying a.c. power input to said circuitry;
(ii) user control means for switching lamps on and off and dimming, thereby controlling said circuitry;
(iii) rectifying circuitry to convert a.c. power input to a plurality of d.c. outputs, including one or more low voltage outputs, and including a doubler circuit for generation of high frequency voltages for gas-based lamps;
(iv) power factor correction circuitry, including at least one power factor correction chip;
(v) comparator circuitry that receives an external control signal and compares it to feedback from the output side of the circuitry, and thereby controls a Pulse Width Modulation (PWM) circuitry;
(vi) said PWM circuitry which sends at least one timing signal to a MOSFET gate driver circuit, and said PWM circuitry being functional to respond to dimming input of said user control means;
(vii) said MOSFET gate driver circuit which receives said timing signal from PWM circuitry and supplies switching control to at least two secondary transistors;
(viii) said at least two secondary transistors, which receive d.c. power from said rectifying circuitry and its doubler circuit and which are controlled by said MOSFET gate driver circuitry such that high frequency voltages are output;

(ix) at least one gas-based lamp-dedicated isolation transformer, with the outputs of said transistors connected to the inputs of said gas-based lamp-dedicated isolation transformer for driving at least one gas-based lamp;

(x) at least one solid state lamp-dedicated isolation transformer, which receive d.c. power from said rectifying circuit, which are controlled by said MOSFET gate driver circuit, at least one solid state lamp-dedicated isolation transformer being a receptacle-dedicated isolation transformer that is for dedication to a single solid state lamp receptacle connection for a single solid state lamp receptacle;

(xi) at least one diode and one resistor located between said at least one solid state-dedicated, isolation transformer and a single lamp receptacle connection to which it is dedicated;

(xii) lamp sensing circuitry receiving input from said rectifying circuitry to detect lamp wattage and to also separately detect lamp outage, and connected to adjustment circuitry to adjust for both wattage size and lamp outage, said lamp sensing circuitry to adjust power as needed to recognize and adjust to wattage requirements of different lamp sizes, and separately to at least partially decrease power when at least one lamp is experiencing outage.

2. The electronic driver for providing light from visible light bulbs and non-visible light bulbs, of claim 1, further comprising means to remotely control said switching on and off.

3. The electronic driver for providing light from visible light bulbs and non-visible light bulbs, of claim 2, further comprising means to remotely control the driver such that said lamps may be dimmed by controlling the PWM circuitry.

4. The electronic driver for providing light from visible light bulbs and non-visible light bulbs, of claim 3, further comprising means to control the driver by a programmable timer and dimmer.

5. The electronic driver for providing light from visible light bulbs and non-visible light bulbs, of claim 1 wherein there is a power factor control segment and a current sensing segment, and each of these segments includes at least one ground connected thereto.

6. The electronic driver for providing light from visible light bulbs and non-visible light bulbs, of claim 1 wherein there is a solid state lamp that is an LED lamp.

7. The electronic driver for providing light from visible light bulbs and non-visible light bulbs, of claim 1 wherein there are at least two solid state lamp-dedicated isolation transformers and at least two solid state lamp receptacles in parallel.

8. The electronic driver for providing light from visible light bulbs and non-visible light bulbs, of claim 1 wherein there are at least two solid state lamp-dedicated isolation transformers and at least two solid state lamp receptacles in parallel and there are LED lamps connected to said at least two solid state lamp receptacles.

9. The electronic driver for providing light from visible light bulbs and non-visible light bulbs, of claim 1 wherein there are at least four solid state lamp-dedicated isolation transformers and at least four solid state lamp receptacles in parallel.

10. The electronic driver for providing light from visible light bulbs and non-visible light bulbs, of claim 1 wherein there is at least one gas-based lamp that is a fluorescent lamp.

11. The electronic driver for providing light from visible light bulbs and non-visible light bulbs, of claim 1 wherein there is at least one gas-based lamp that is an ultraviolet lamp.

12. The electronic driver for providing light from visible light bulbs and non-visible light bulbs, of claim 1 wherein there is at least one gas-based lamp that is an infrared lamp.

13. The electronic driver for providing light from visible light bulbs and non-visible light bulbs, of claim 1 wherein said rectifying circuit includes a snubber unit that includes at least one rectifier.

14. The electronic driver for providing light from visible light bulbs and non-visible light bulbs, of claim 1 which further includes an in-driver rechargeable 12 volt battery, alternating current power failure recognition, and 12 volt switch responsive to sensing alternating current power failure for 12 volt solid state powering.

15. The electronic driver for providing light from visible light bulbs and non-visible light bulbs, of claim 1 which further includes a zeta scan component connected to said electronic circuitry mounted on said housing unit.

16. The electronic driver for providing light from visible light bulbs and non-visible light bulbs, of claim 15 wherein said zeta scan component includes:

(i) connection means for connecting and applying a.c. power input to said zeta scan component;

(ii) at least one frequency timer;

(iii) at least one input comparator connected to said frequency timer;

(iv) at least one output comparator connected to said frequency timer; and, (v) a plurality of resistors and capacitors situated between said input comparator and said frequency timer, and at least one resistor and at least one capacitor situated between said frequency timer and said input comparator.

17. The electronic system for providing light of claim 15 wherein there is at least one solid state lamp receptacle and at least one solid state lamp in said receptacle, said lamp being selected from a single end screw-in bulb, a single end pin connector bulb and a dual connector elongated lamp having connectors at opposing ends.

18. The electronic system for providing light of claim 15, further comprising the means to remotely control the driver such that said lamps may be dimmed by controlling the PWM circuitry.

19. The electronic system for providing light of claim 15, further comprising means to control the driver by a programmable timer and dimmer.

* * * * *